United States Patent [19]

Gics

[11] Patent Number: 5,492,703
[45] Date of Patent: Feb. 20, 1996

[54] FOOD PACKAGE INCLUDING A FOOD PACKAGE TRAY PARTIALLY SURROUNDED BY A FOOD PACKAGE JACKET AND AN ASSOCIATED METHOD

[75] Inventor: Paul W. Gics, Sewickley Heights, Pa.

[73] Assignee: Gics & Vermee, L.P., Sewickley Heights, Pa.

[21] Appl. No.: 298,527

[22] Filed: Aug. 30, 1994

[51] Int. Cl.⁶ .................................................. B65D 85/00
[52] U.S. Cl. ........................... 426/87; 426/106; 426/122; 426/383; 426/392; 426/396; 206/459.5
[58] Field of Search ........................... 426/106, 87, 392, 426/383, 396, 122; 206/459.5; 220/461, 402, 403, 405, 410, 359; 53/329.3, 415, 478

[56] References Cited

U.S. PATENT DOCUMENTS

| | | | |
|---|---|---|---|
| 3,160,326 | 12/1964 | Sturdevant et al. | 222/183 |
| 3,298,505 | 1/1967 | Stephenson | 206/45.31 |
| 3,372,856 | 3/1968 | Erhart et al. | 229/125.19 |
| 3,436,894 | 4/1969 | Sorenson | 53/478 |
| 3,449,183 | 6/1969 | Zelnick | 53/478 |
| 3,458,380 | 7/1969 | Kipp | 156/309.6 |
| 3,495,758 | 2/1970 | Wienecke, Jr. | 229/43 |
| 3,567,104 | 6/1971 | Arslanian et al. | 229/14 |
| 3,785,544 | 1/1974 | Smith | 229/14 |
| 3,863,832 | 2/1975 | Gordon et al. | 229/30 |
| 4,257,530 | 3/1981 | Faller | 220/469 |
| 4,351,473 | 9/1982 | Manizza | 229/43 |
| 4,373,636 | 2/1983 | Hoffman | 206/551 |
| 4,398,077 | 8/1983 | Freedman et al. | 219/10.55 E |
| 4,531,668 | 7/1985 | Forbes, Jr. | 229/43 |
| 4,676,857 | 6/1987 | Scharr et al. | 156/233 |
| 4,713,510 | 12/1987 | Quick et al. | 219/10.55 E |
| 4,763,790 | 8/1988 | McGeehins | 206/557 |
| 4,794,005 | 12/1988 | Swiontek | 426/107 |
| 4,831,224 | 5/1989 | Keefer | 219/10.55 E |
| 4,841,112 | 6/1989 | Peleg | 219/10.55 E |
| 4,870,233 | 9/1989 | McDonald et al. | 219/10.55 E |
| 4,899,882 | 2/1990 | Benner | 206/459.5 |
| 4,916,280 | 4/1990 | Havette | 219/10.55 E |
| 4,917,748 | 4/1990 | Harrison | 156/230 |
| 4,939,332 | 7/1990 | Hahn | 219/10.55 E |
| 4,955,530 | 9/1990 | Rigby et al. | 229/123 |
| 4,994,638 | 2/1991 | Iorns et al. | 219/10.55 E |
| 5,032,213 | 7/1991 | Thomas, Jr. | 156/498 |
| 5,039,833 | 8/1991 | Woods | 219/10.55 |
| 5,040,357 | 8/1991 | Ingemann | 53/476 |
| 5,090,615 | 2/1992 | Hopkins et al. | 229/125.35 |
| 5,126,518 | 6/1992 | Beckett | 219/10.55 E |
| 5,234,159 | 8/1993 | Lorence et al. | 229/125.35 |
| 5,310,977 | 5/1994 | Stenkamp et al. | 219/730 |
| 5,326,575 | 7/1994 | Spaulding | 206/459.5 |
| 5,352,465 | 10/1994 | Gondek et al. | 426/87 |
| 5,356,649 | 10/1994 | LaMotta et al. | 426/396 |
| 5,366,102 | 11/1994 | Bergner et al. | 206/459.5 |
| 5,370,883 | 12/1994 | Saunier | 426/107 |

FOREIGN PATENT DOCUMENTS

| | | |
|---|---|---|
| 0276654 | 8/1988 | European Pat. Off. . |
| 0327243 | 8/1989 | European Pat. Off. . |
| 0399981 | 11/1990 | European Pat. Off. . |
| 0492052 | 7/1992 | European Pat. Off. . |
| 2164868 | 8/1973 | France . |
| 2629424 | 10/1989 | France . |
| 2046060 | 5/1983 | United Kingdom . |
| 8604880 | 8/1986 | WIPO . |
| 8805249 | 7/1988 | WIPO . |
| 9105448 | 4/1991 | WIPO . |

*Primary Examiner*—Donald E. Czaja
*Assistant Examiner*—Lien Tran
*Attorney, Agent, or Firm*—David V. Radack; Eckert Seamans Cherin & Mellott

[57] ABSTRACT

A food package including a food package tray partially surrounded by a food package jacket. The food package tray has a base and a sidewall extending from the base. The food package jacket has a bottom flap disposed adjacent to at least a portion of the base of tray and at least one side flap extending from the bottom flap and disposed adjacent to at least a portion of the sidewall. The side flap has a section adhesively secured to the sidewall. In this way, the food package jacket and food package tray form the food package. An associated method is also disclosed.

18 Claims, 7 Drawing Sheets

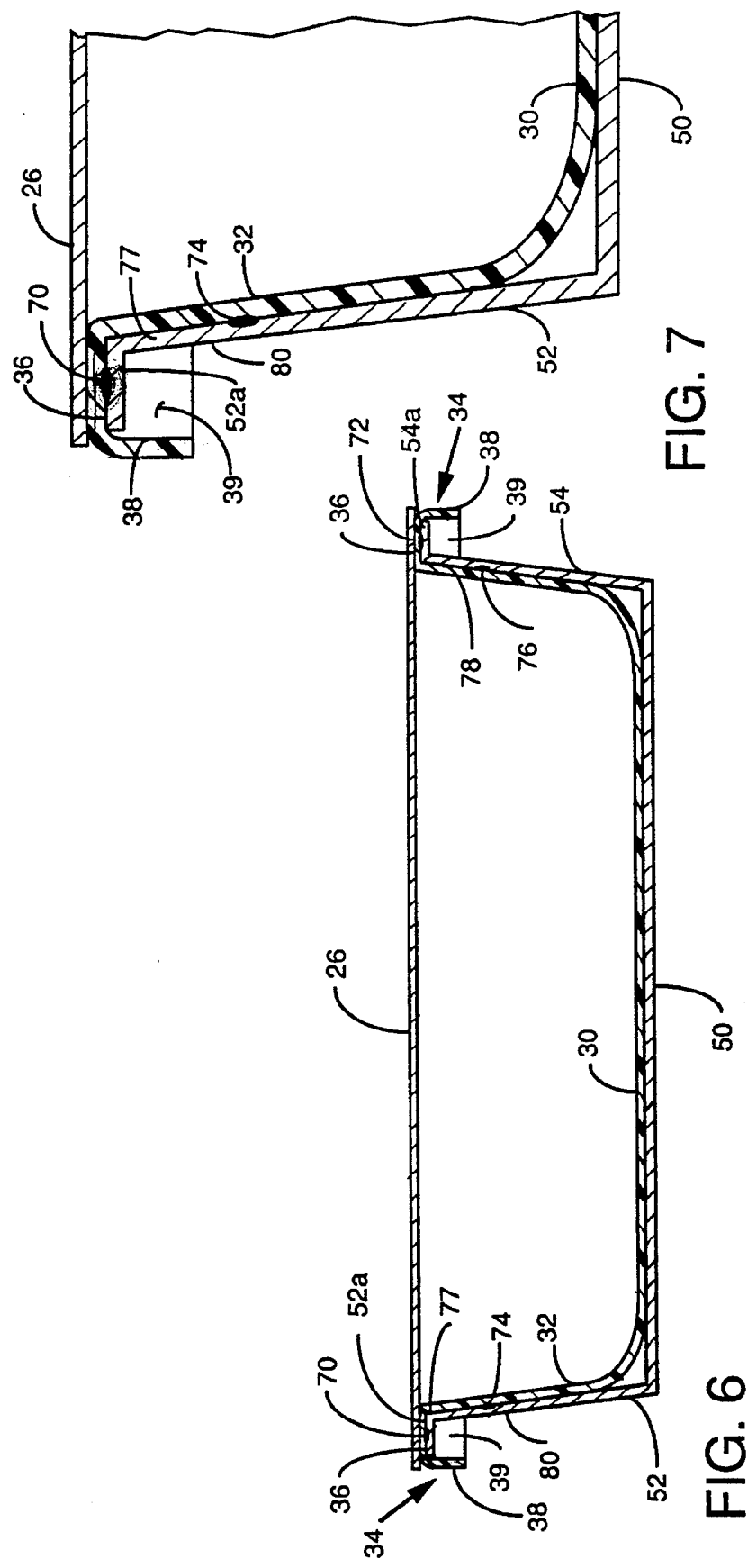

5,492,703

FOOD PACKAGE INCLUDING A FOOD PACKAGE TRAY PARTIALLY SURROUNDED BY A FOOD PACKAGE JACKET AND AN ASSOCIATED METHOD

BACKGROUND OF THE INVENTION

This invention relates to a food package including a food package tray which is partially surrounded by a food package jacket and an associated method. The food package jacket has a bottom flap which is disposed adjacent to the base of the food package tray and at least one side flap disposed adjacent to the sidewalls of the tray.

One of the purposes of food packages is to provide a surface on which informational and marketing indicia are printed. For example, it is well known that an attractive food package can be influential in the consumer's purchasing decision. Thus, vendors of food products spend a considerable amount of time designing the packaging and labelling of their products.

In addition to marketing information and other eye catching designs which are printed on labels, information required by the government must be printed on the labels. For example, in the United States, nutritional information such as the amount of calories, fat and sodium in the food product are required to be printed on the labels. This required printed information, of course, limits the space available for marketing purposes and can also detract from the overall design of the package.

U.S. Pat. No. 5,090,615 discloses a package containing a lid that increases the surface area of a label. This patent discloses providing a lid having side flaps and a bottom flap. The side flaps define a plane oriented substantially perpendicular to the lid such that the package is stable when resting on the side flap.

Although the stated goal of achieving increased surface area is achieved by that design, there are several problems associated with the package and the method of making the package. First, there is a problem in sealing the lid to the food package tray. This is due to a lack of stiffness in the flange of the tray to which the lid is sealed. Second, once the lid is sealed to the tray, the lid must be folded several times, which is difficult to do because of the lack of stiffness of the tray as well as the fact that there is food in the package which must be upset during the folding process. Third, and finally, the lid has a flap which is glued to the bottom of the tray. When the tray is placed into the microwave, the glue can become liquid and can get deposited on the microwave floor. In addition, the heating of the glue in the microwave can cause an offensive odor, which, as can be appreciated, is universally undesired.

What is needed, therefore, is a food package that accomplishes the goal of increasing label space, but which does so without the attendant disadvantages of current prior art packages.

SUMMARY OF THE INVENTION

The invention has met the above-captioned need. A food package is disclosed comprising a food package tray and a food package jacket partially surrounding the tray. The food package jacket has a bottom flap disposed adjacent to at least a portion of the base and at least one side flap extending from the bottom flap and disposed adjacent to at least a portion of the sidewall. The side flap has a section adhesively secured to the sidewall. In this way, the food package jacket and the food package tray form a food package in which the surface area for printing indicia on the food package is increased.

An associated method of producing a unitized food package containing a food product is also disclosed.

BRIEF DESCRIPTION OF THE DRAWINGS

A full understanding of the invention can be gained from the following description of the preferred embodiment when read in conjunction with the accompanying drawings in which:

FIG. 6 is a cross-sectional view taken along line 6—6 of FIG. 4.

FIG. 7 is a detailed sectional view of the flange shown in FIG. 6.

DETAILED DESCRIPTION

Figure 1:
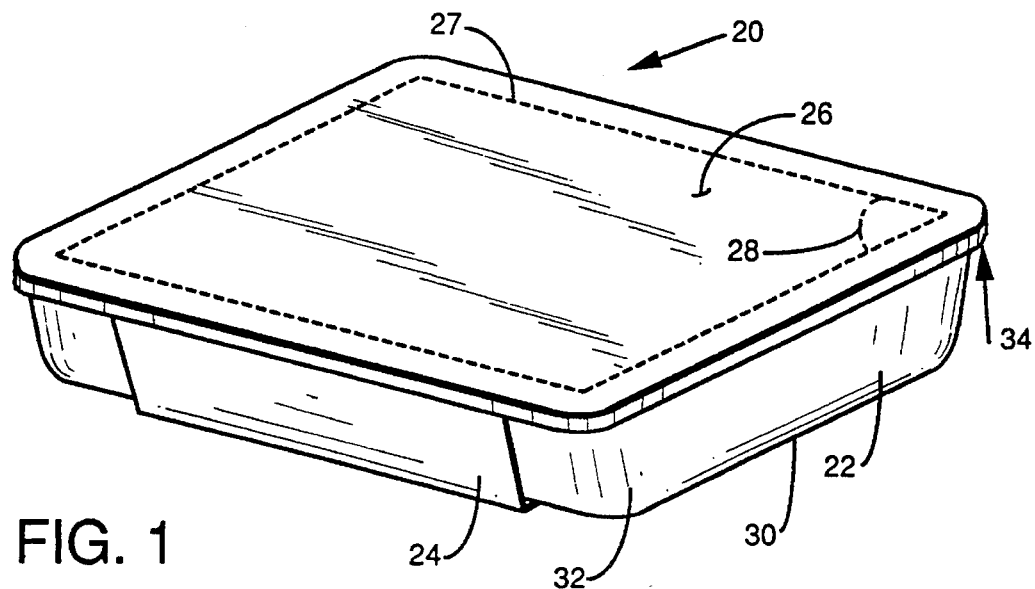
FIG. 1 is a perspective view of a food package of the invention showing a food package tray having disposed thereon a food package jacket.
Figure 2:
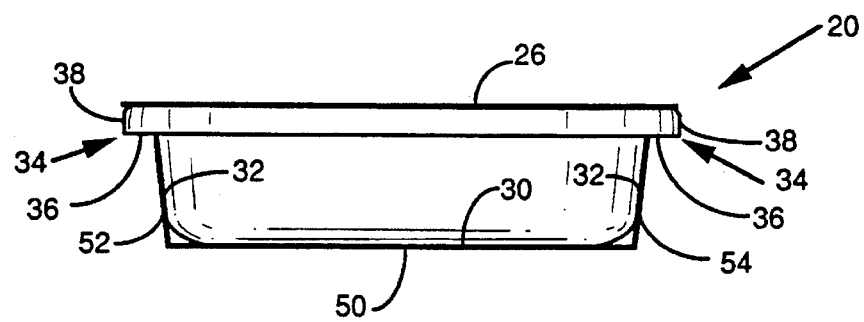
FIG. 2 is a side elevational view of the food package shown in FIG. 1.
Figure 3:
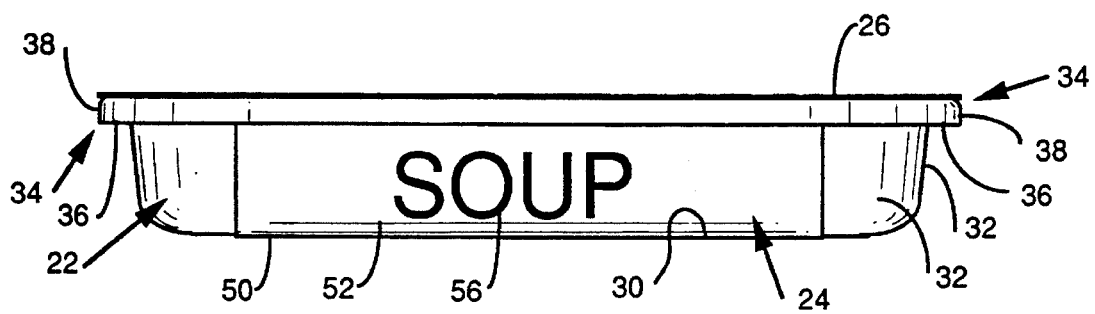
FIG. 3 is a front elevational view of the food package shown in FIG. 1.
Figure 4:
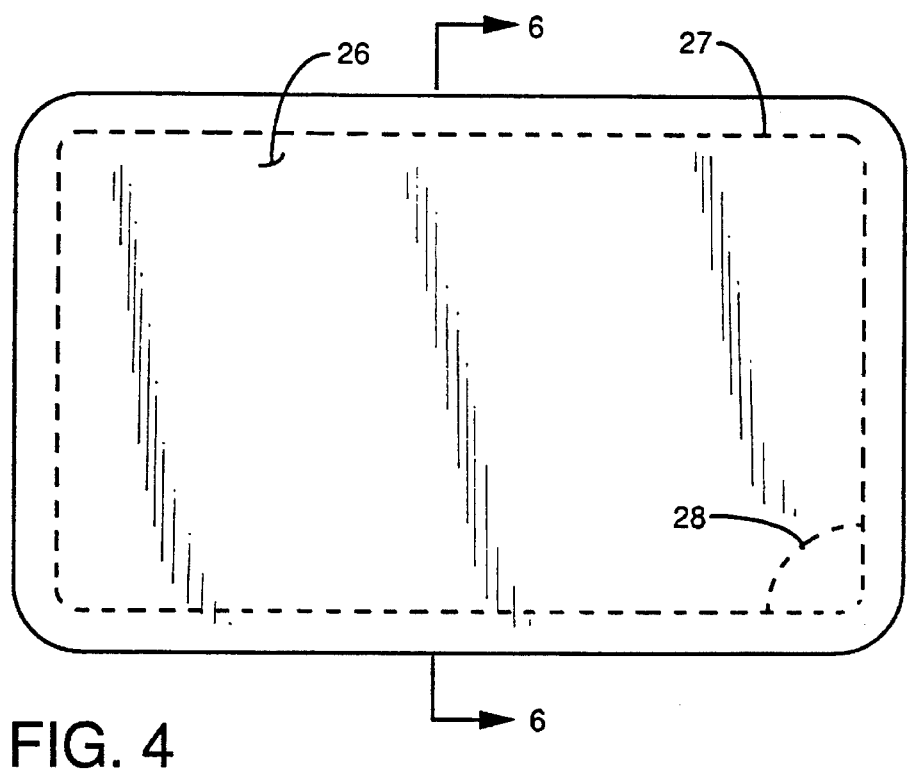
FIG. 4 is a top plan view of the food package shown in FIG. 1.
Figure 5:
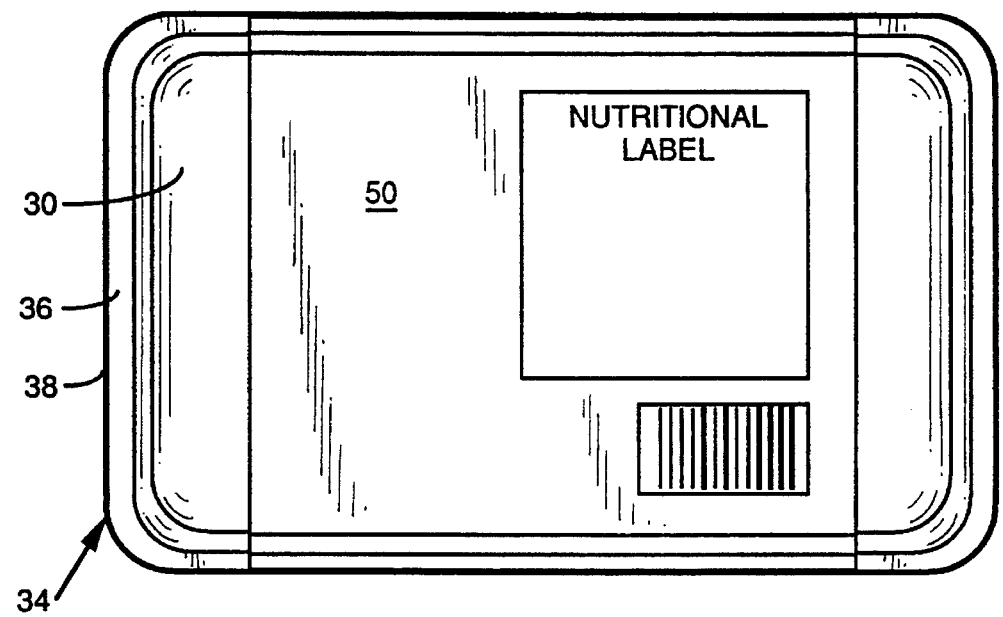
FIG. 5 is a bottom plan view of the food package shown in FIG. 1.

Referring to FIG. 1, a food package 20 in accordance with the invention is shown. The food package 20 consists of a food package tray 22 and food package jacket 24 partially surrounding the food package 20 shown in FIG. 1 is shown with a lid 26 sealed thereto. The lid 26 is removed from the food package 20 with the aid of score line 27 which is disposed around the perimeter of the lid 26. Preferably, a finger tab is provided by score line 28 in order to facilitate removal of the lid 26.

Preferably, the food package tray 22 is made of plastic and, more preferably, crystallized polyethylene terephthalate ("C-PETE"). The food package jacket 24 and lid 26 are preferably made of a paper product, such as paperboard. It will be appreciated, however, that the invention contemplates any type of material composition for the food package tray 22, food package jacket 24 and lid 26.

As can be seen in FIGS. 2, 3 and 5–7, the food package jacket 24 partially surrounds the food package tray 22. The food package tray 22 itself consists of a base 30 and a sidewall 32 extending from the base 30. The sidewall 32 includes a flange 34 consisting of a first portion 36 extending generally perpendicularly from the sidewall 32 and a second portion 38 extending generally perpendicularly from the first portion 36. The flange 34 and the sidewall 32 form a space 39 (FIGS. 6 and 7). The primary purpose of the second portion 38 is aesthetic in nature in that it hides from view the securement point of the food package jacket 24 to the food package tray 22, as will be discussed hereinbelow.

Figure 8:
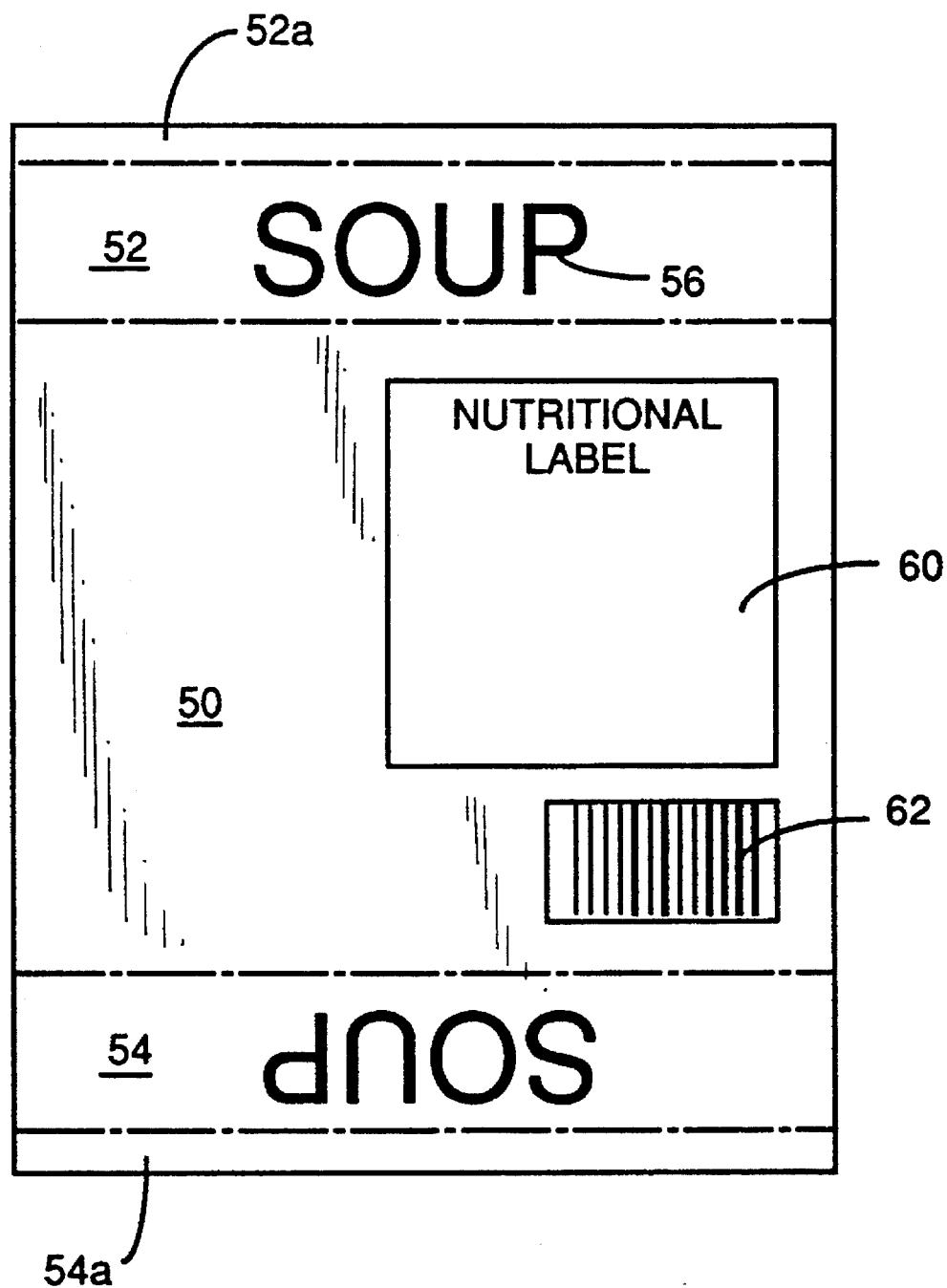
FIG. 8 is a top plan view of the unfolded food package jacket blank.
Figure 9:
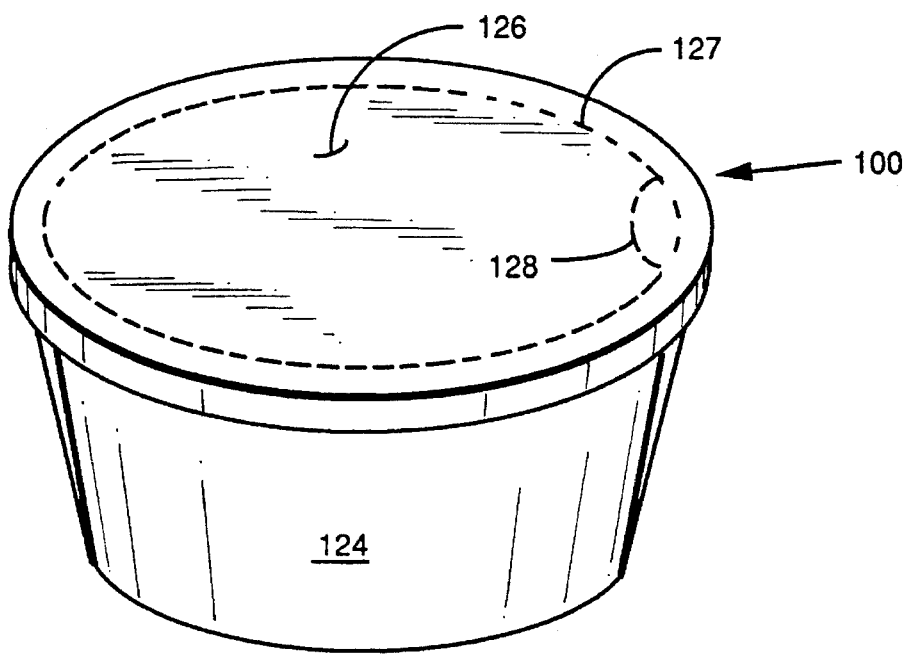
FIG. 9 is a perspective view of a circular food package of the invention.
Figure 10:
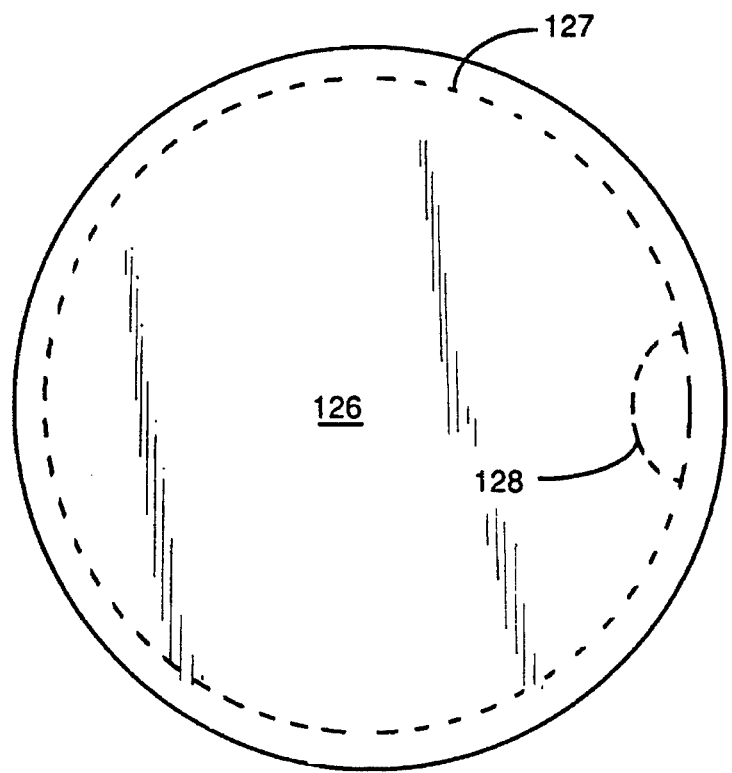
FIG. 10 is a top plan view of the food package shown in FIG. 9.
Figure 11:
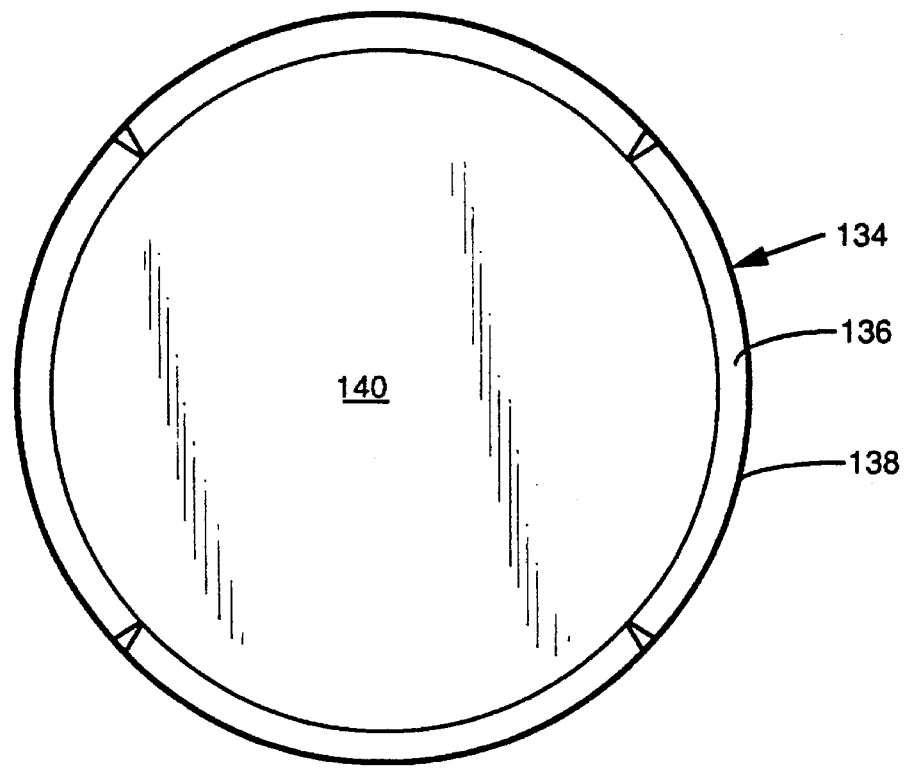
FIG. 11 is a bottom plan view of the food package shown in FIG. 9.
Figure 12:
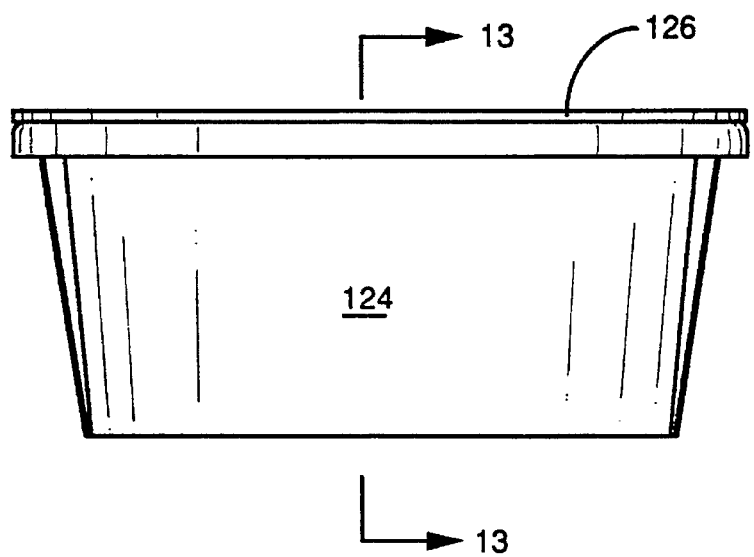
FIG. 12 is a side elevational view of the food package shown in FIG. 9.

Referring to FIG. 8, the food package jacket 24 is shown before it is folded and secured to the food package tray 22. The food package jacket 24 shown in FIG. 8 has a bottom flap 50 and two side flaps 52, 54. The side flaps each contain an arm section 52a and 54a respectively. It will be appreciated that food product indicia, such as the indicia "soup" 56 can be placed anywhere on the exposed surface of the food package jacket 24. Other indicia, such as nutritional indicia 60 can be placed on the bottom flap 50. Space is also provided on that bottom flap 50 for bar code indicia 62.

Referring particularly to FIGS. 6 and 7, the food package jacket 24 is shown as it is secured to the food package tray 22. In particular, these figures show that a heat activated adhesive 70 and 72 is disposed on a portion of the arm section 52a, 54a, respectively, as well as a heat activated adhesive 74, 76 is disposed on the upper section 77, 78 of the side flaps 52 and 54. The food package jacket 24 is secured to the food package tray 22 by a heat seal die (not shown) pressing against the outer surface of the food package jacket 24 in space 39. The heat seal die causes the adhesive to melt and also presses the arm sections 52a and 54a and the upper sidewall portions 77 and 78 against the first portion 36 of flange 34 and sidewall 32, respectively. In this way the food package jacket 24 is secured to the sidewall 32 of the food package tray 22.

It will be appreciated that although food package tray 22 is shown with a flange 34 and food package jacket 24 is shown with arm sections 52a and 54a, that either or both of these features could be eliminated while still falling within the scope of the invention. That is, a food package jacket could be secured by the side flap only contacting only the sidewall. The side flap could also contain an arm section which is only secured to the first portion of the flange, without the side flap itself being secured to the sidewall. The key point is that the side flap of the food package jacket is secured to the sidewall of the food package tray.

It will be appreciated that the heat sealing die also provides a support for the flange 34 when the lid 26 is heat sealed to the flange 34 after the food package tray 22 is filled with food.

Figure 13:
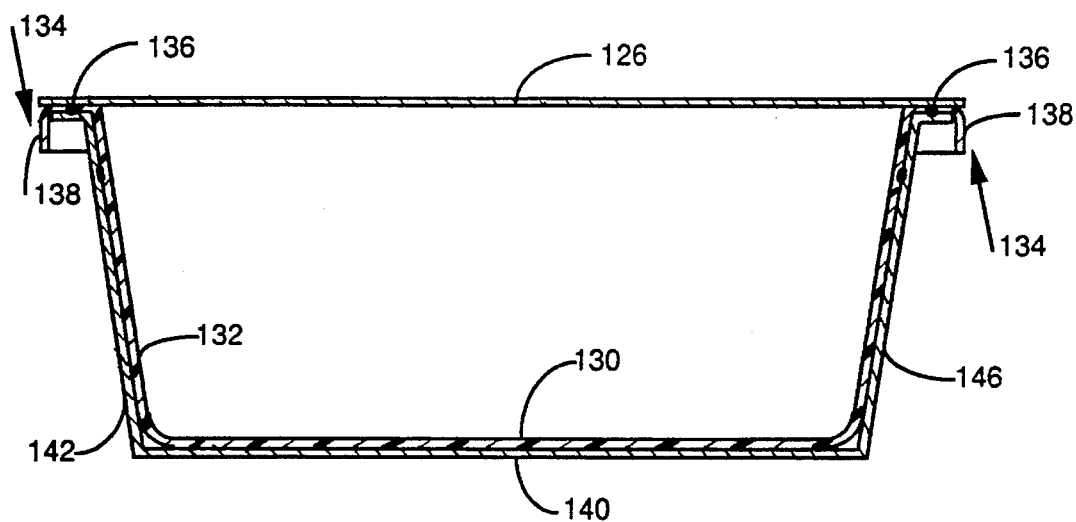
FIG. 13 is a cross-sectional view taken along line 12—12 of FIG. 10.
Figure 14:
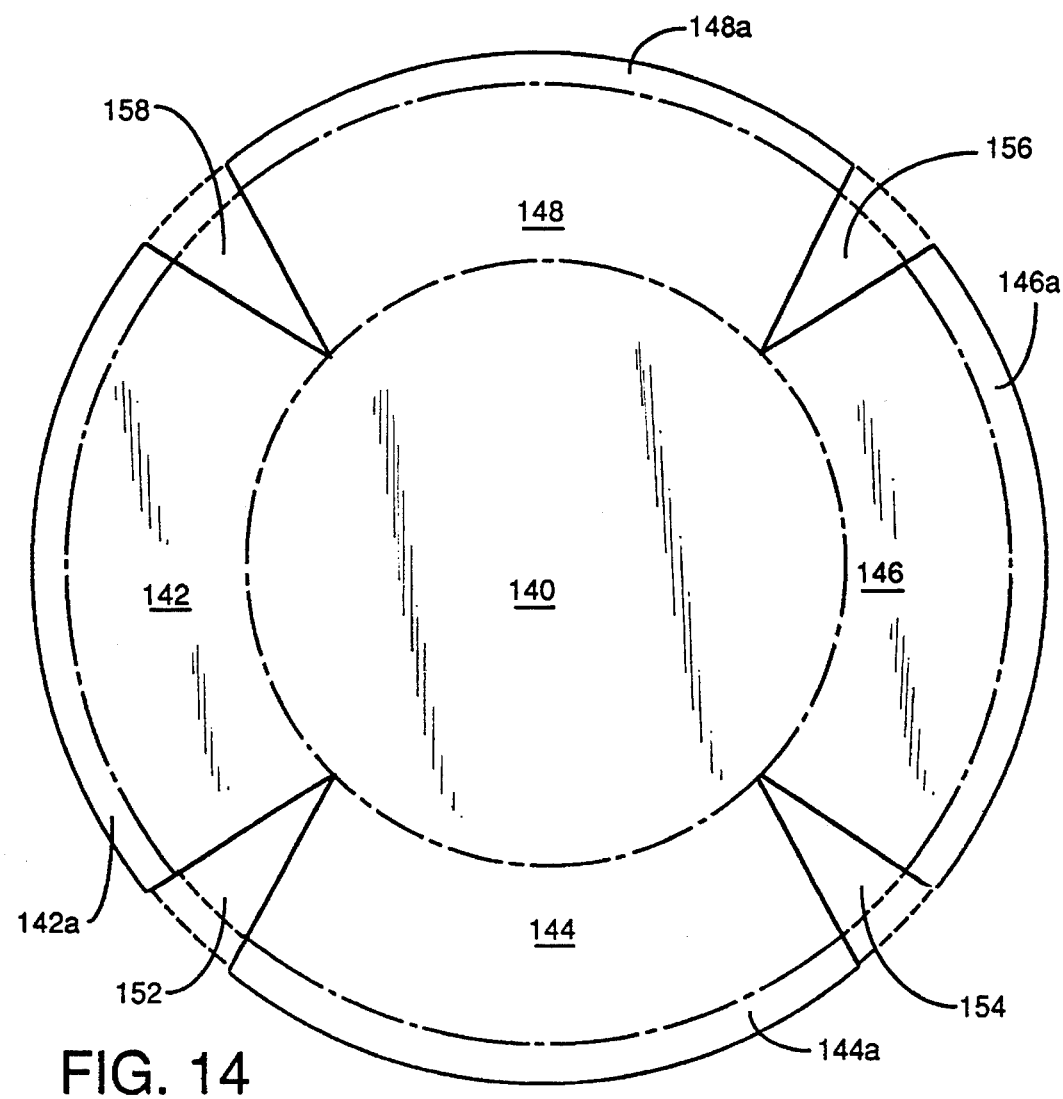
FIG. 14 is a top plan view of the unfolded food package jacket blank shown in FIGS. 9–11.

Referring now to FIGS. 9–14, another embodiment 100 of a food package is shown. In this embodiment, the food package 100 consists of a food package tray 122, a food package jacket 124 and a lid 126. The lid 126 is removed from the food package 100 with the aid of score line 127 which is disposed around the perimeter of the lid 126. Preferably, a finger tab is provided by score line 128 in order to facilitate removal of the lid 126. The food package tray 122 in this embodiment has a base 130, with a sidewall 132 extending therefrom including a flange 134 having a first portion 136 and a second portion 138. The food package jacket 124, which is shown in its unfolded blank state in FIG. 14, consists of a circular bottom flap 140 and four side flaps 142, 144, 146 and 148. Each of the side flaps include an arm section 142a, 144a, 146a, 148a. It will be appreciated that in order to secure the food package jacket 124 to the sidewall 132, that tabs 152, 154, 156 and 158, shown in phantom in FIG. 14, must be cut out of a larger circular blank. As can be seen in FIG. 13, the side flaps are secured to the sidewall 122 and first portion 136 similarly as to the corresponding elements shown in FIGS. 1–8.

The method of the invention comprises providing a food package 20, 100 having a base 30, 130 and a sidewall 32, 132 extending from the base 30, 130 and providing a food package jacket 24, 124 having a bottom flap 50, 140 and at least one side flap 52, 54, 142, 144, 146, 148 extending from the bottom flap. The method further comprises adhesively securing a section of the side flap to the sidewall to make the food package.

It will be appreciated that a food package consisting of a food package tray and a food package jacket and an associated method of making a food package has been provided. The food package of the invention provides increased surface area for printing indicia thereon, while avoiding the pitfalls and limitations of prior art food packages.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A food package comprising:

a food package tray having a base and a sidewall extending from said base, said sidewall including flange means extending therefrom said flange means having a first portion extending generally perpendicularly from said sidewall and a second portion extending generally perpendicularly from said first portion;

a food package jacket partially surrounding said food package tray, said food package jacket having a bottom flap disposed adjacent to at least a portion of said base and at least one side flap extending from said bottom flap and disposed adjacent to at least a portion of said sidewall; and said side flap having a section adhesively secured to said sidewall, whereby said food package jacket and said food package tray form said food package.

2. The food package of claim 1, wherein said side flap includes an arm section extending generally perpendicularly from said side flap; and said arm section being adhesively secured to said first portion.

3. The food package of claim 1, wherein said base is generally rectangular in shape; and said food package jacket includes a generally rectangular bottom flap and a pair of opposed side flaps extending from said bottom flap.

4. The food package of claim 1, wherein said base is generally circular in shape; and said food package jacket includes a generally circular bottom flap and at least one side flap extending from said bottom flap.

5. The food package of claim 4, wherein said food package jacket is formed from a sheet having a circular central portion and a plurality of side flap members extending from said central portion in order to facilitate placement of said food package jacket on said food package tray.

6. The food package of claim 1, including a lid secured to said food package tray.

7. The food package of claim 1, wherein said food package tray is made of crystallized polyethylene terephthalate.

8. The food package of claim 1, wherein said food package jacket is made of paperboard.

9. The food package of claim 1, wherein said side flap is secured to said sidewall by adhesive means, said adhesive means is a heat activated adhesive.

10. The food package of claim 1, including indicia means printed on said food package jacket, said indicia means includes food product identification indicia and nutritional information indicia.

11. A method of making a food package comprising:

providing a food package tray having a base and a sidewall extending from said base, said sidewall including flange means extending therefrom, said flange means having a first portion extending generally perpendicularly from said sidewall and a second portion extending generally perpendicularly from said first portion;

providing a food package jacket having a bottom flap and at least one side flap; and adhesively securing a section of said side flap to said sidewall to make said food package.

12. The method of claim 11, including said base is generally rectangular in shape; and said food package jacket includes a generally rectangular bottom flap and a pair of opposed side flaps extending from said bottom flap.

13. The method of claim 11, including said base is generally circular in shape; and said food package jacket includes a generally circular bottom flap and at least one side flap extending from said bottom flap.

14. The method of claim 13, including said food package jacket is formed from a sheet having a circular central portion and a plurality of side flap members extending from said central portion in order to facilitate placement of said food package jacket on said food package tray.

15. The method of claim 11, including depositing a food product in said food package; and placing a lid on said food package to seal the contents thereof.

16. The method of claim 11, including employing crystallized polyethylene terephthalate as the material for said food package tray.

17. The method of claim 11, including employing paperboard as the material for said food package jacket.

18. The method of claim 11, including providing a layer of heat activated adhesive on said side flaps; and adhesively securing said side flap to said sidewall by applying heat to said side flap so that said heat activated adhesive melts and is adhesively secured to said sidewall.

* * * * *